United States Patent
Jang (10) Patent No.: US 12,303,350 B2
(45) Date of Patent: May 20, 2025

(54) LATERAL WALL SUPPORTED IMPLANT SYSTEM WITH SUPPORTING SCREW SURGICAL GUIDE

(71) Applicant: Wonseok Jang, Millburn, NJ (US)

(72) Inventor: Wonseok Jang, Millburn, NJ (US)

( * ) Notice: Subject to any disclaimer, the term of this patent is extended or adjusted under 35 U.S.C. 154(b) by 280 days.

(21) Appl. No.: 17/814,884

(22) Filed: Jul. 26, 2022

(65) Prior Publication Data
US 2023/0038933 A1    Feb. 9, 2023

(30) Foreign Application Priority Data
Aug. 4, 2021   (KR) .................. 10-2021-0102401

(51) Int. Cl.
*A61C 8/00* (2006.01)
*A61C 1/08* (2006.01)

(52) U.S. Cl.
CPC ............ *A61C 8/0009* (2013.01); *A61C 1/084* (2013.01); *A61C 8/0022* (2013.01)

(58) Field of Classification Search
CPC ....... A61C 8/0009; A61C 8/0022; A61C 8/00; A61C 8/0031; A61C 1/084
USPC ...................................... 433/173–176, 201.1
See application file for complete search history.

(56) References Cited

U.S. PATENT DOCUMENTS

| 5,542,847 A  * | 8/1996 | Margulies ............ A61C 8/0009 433/176 |
| 2002/0031747 A1* | 3/2002 | Laster .................... A61C 8/001 433/201.1 |

FOREIGN PATENT DOCUMENTS

| DE | 1566223 A1 * | 10/1970 | ............ A61C 8/0089 |
| DE | 102005016740 A1 * | 10/2006 | ............. A61C 1/084 |
| WO | WO-2018011604 A2 * | 1/2018 | ......... A61C 13/0004 |

OTHER PUBLICATIONS

Henfling, DE 102005016740 A1, Dental implant has shaft with cross bore and key with arm forming drill guide to aid drilling of cross bore,Oct. 12, 2006, Machine translation (Year: 2006).*
Heinz, DE 156223 A1, Zahnaerztlich-chirurgisches Schraubenkreuzimlantat Zur Verankerung Von Zahnersatz, Feb. 23, 1967, Machine translation (Year: 1967).*

* cited by examiner

*Primary Examiner* — Ralph A Lewis
*Assistant Examiner* — Mirayda A Aponte (57) ABSTRACT

Disclosed is a lateral wall supported implant system having a supporting screw surgical guide. According to the present invention, there is provided the lateral wall supported implant system including: a primary screw placed in the alveolar bone; a surgical guide disposed on a lateral wall of the alveolar bone with the primary screw placed therein; and supporting screws passing through the surgical guide and the lateral wall and then coupled to the primary screw to provide supporting forces for the primary screws so that the primary screw is supported against the lateral wall to have the primary stability thereof.

12 Claims, 10 Drawing Sheets

LATERAL WALL SUPPORTED IMPLANT SYSTEM WITH SUPPORTING SCREW SURGICAL GUIDE

CROSS REFERENCE TO RELATED APPLICATION OF THE INVENTION

The present application claims the benefit of Korean Patent Application No. 10-2021-0102401 filed in the Korean Intellectual Property Office on Aug. 4, 2021, the entire contents of which are incorporated herein by reference.

BACKGROUND OF THE INVENTION

Field of the Invention

The present invention relates to a lateral wall-supported implant system, and more specifically, to a lateral wall-supported implant system that is capable of fixing the primary screw (implant body) in the alveolar bone with a large bone defect and poor bone quality with the help of supporting screws and a surgical guide, thereby ensuring immediate primary stability of the implant body, without the need of additional healing time that is required for additional bone graft and delayed implant placement.

Background of the Related Art

Dental implant surgery is a surgical procedure to place a biologically inert metal screw, such as a titanium dental implant, into the alveolar bone of a patient to promote osseointegration of the dental implant with the ultimate goal of replacing a missing tooth with an implant-supported crown or artificial tooth, so that the function of the natural tooth can be restored.

A dental implant is commonly considered the gold standard for replacing a missing tooth. A dental implant can restore the function and aesthetic of a natural tooth with very high predictability and longevity. Dental implant surgery has been widely carried out in the last few decades.

Figure 1A:
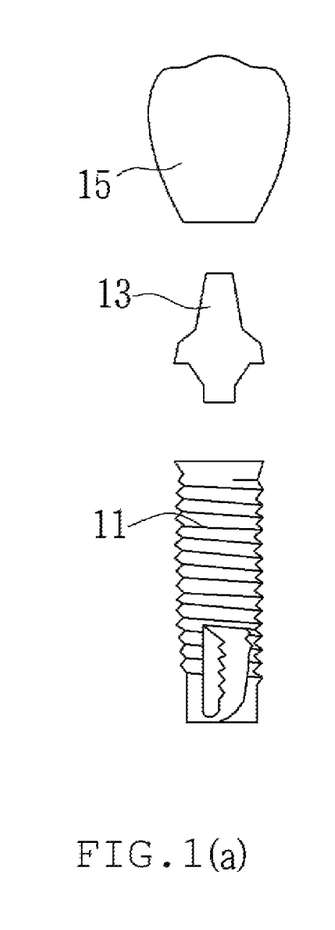
FIG. 1A is an exemplary view showing an implant configuration.
Figure 1B:
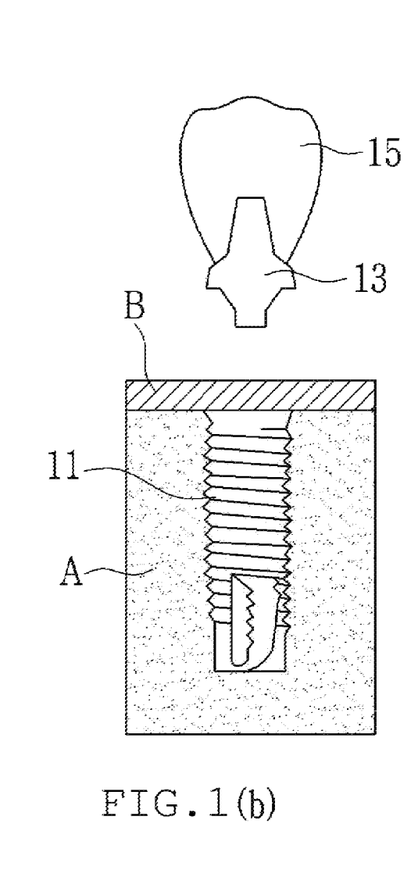
FIG. 1B is an exemplary view showing the implant procedure with the fixture embedded in the alveolar bone.
Figure 1C:
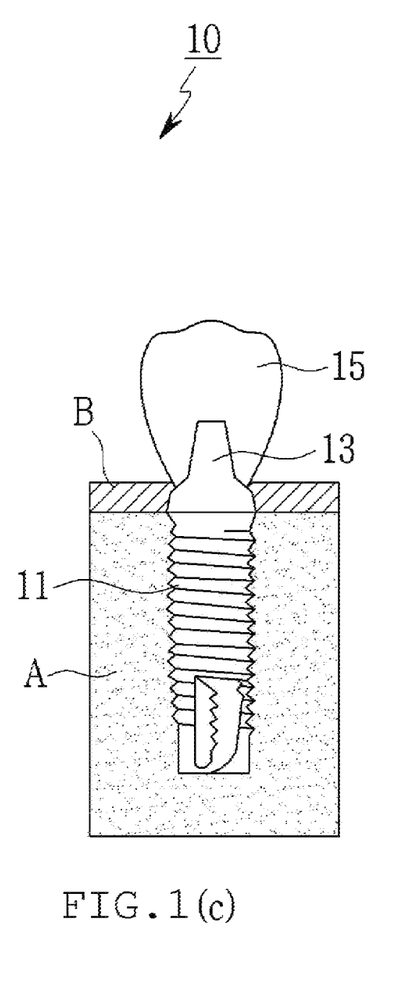
FIG. 1C is an exemplary view showing the implant procedure after completion.

FIGS. 1A to 1C are exemplary views showing general dental implant surgery. As shown in FIG. 1A, an implant 10 includes a fixture 11 placed in the alveolar bone A, an abutment 13 coupled to the fixture 11, and a tooth-shaped crown 15 coupled to the abutment 13.

As shown in FIG. 1B, the dental implant surgery is carried out by making a hole in the alveolar bone A by means of a dedicated drill, placing the fixture 11 in the hole, and osseointegrating the fixture 11 with the alveolar bone A. Further, as shown in FIG. 1C, the abutment 13 is coupled to the fixture 11, and next, the crown 15 is coupled to the abutment 13, thereby completing the dental implant surgery.

The implant has to perform the real function of the natural tooth as well as to appropriately distribute the load applied thereto during chewing motions to thus achieve long time usage.

The success rate and long-term prognosis of the implant depend on the stability of the implant, that is, the fixed degree of the implant. The stability of the implant is produced by the sum of primary stability (mechanical stability) obtained through the contact of the implant with the bone around the implant and secondary stability (biological stability) obtained when new bond tissue is formed to cause osseointegration of the implant therewith after the implant has been placed.

The primary stability of the implant is greatly influenced by the bone quantity and quality of the patient. If it is hard to ensure the primary stability that is important in the osseointegration due to poor bone quantity and quality of the patient, early failure of the implant may occur, and further, if an excessive load is applied to the implant with low primary stability, the osseointegration may be delayed due to micromotions. Accordingly, delayed implant placement where a load is applied after sufficient bone formation time for three to six months has been applied to conventional implants.

The delayed implant placement requires processes of the extraction of a tooth having no change of recovery, the bone graft for bone preservation, and soft and hard tissue treatment (which are carried out for about six months), fixture placement and additional treatments for osseointegration of fixture (which are carried out for three to six months), and abutment coupling and crown loading, thereby consuming a total of 9 to 12 months.

Through the delayed implant placement, therefore, the primary stability of the implant may be ensured, but unfortunately, the surgery may continue for a long period of time.

SUMMARY OF THE INVENTION

Accordingly, the present invention has been made in view of the above-mentioned problems occurring in the related art, and it is an object of the present invention to provide a lateral wall-supported implant system that is capable of allowing a primary screw to be directly placed even in a portion with a big bone tissue defect, without a separate bone supplement process, thereby ensuring the primary stability of the primary screw without delaying the total treatment time.

To accomplish the above-mentioned object, according to the present invention, there is provided a lateral wall supported implant system including: a primary screw placed in the alveolar bone; a surgical guide disposed on a lateral wall of the alveolar bone with the primary screw placed therein; and supporting screws passing through the surgical guide and the lateral wall and then coupled to the primary screw to provide supporting forces for the primary screws so that the primary screw is supported against the lateral wall to have the primary stability thereof; the most common bony walls that are expected to be used, for the support of primary screw via supporting screws, are the palatal wall of the maxilla and the lingual wall of the mandible.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Hereinafter, embodiments of the present invention will be explained in detail with reference to the attached drawings.

Figure 2:
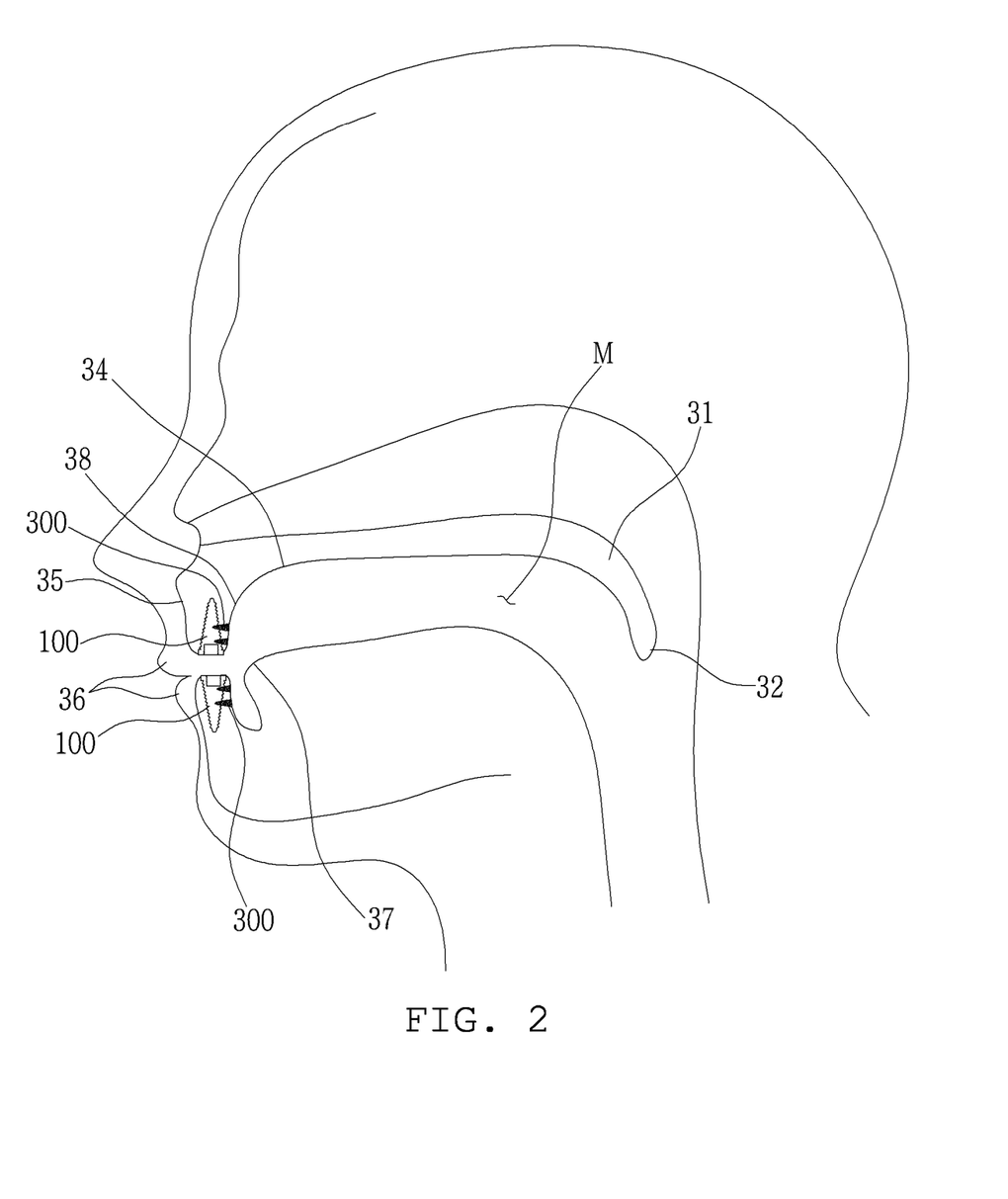
FIG. 2 is an exemplary view showing a state where a lateral wall supported implant system according to the present invention is placed in a patient's face.
Figure 3:
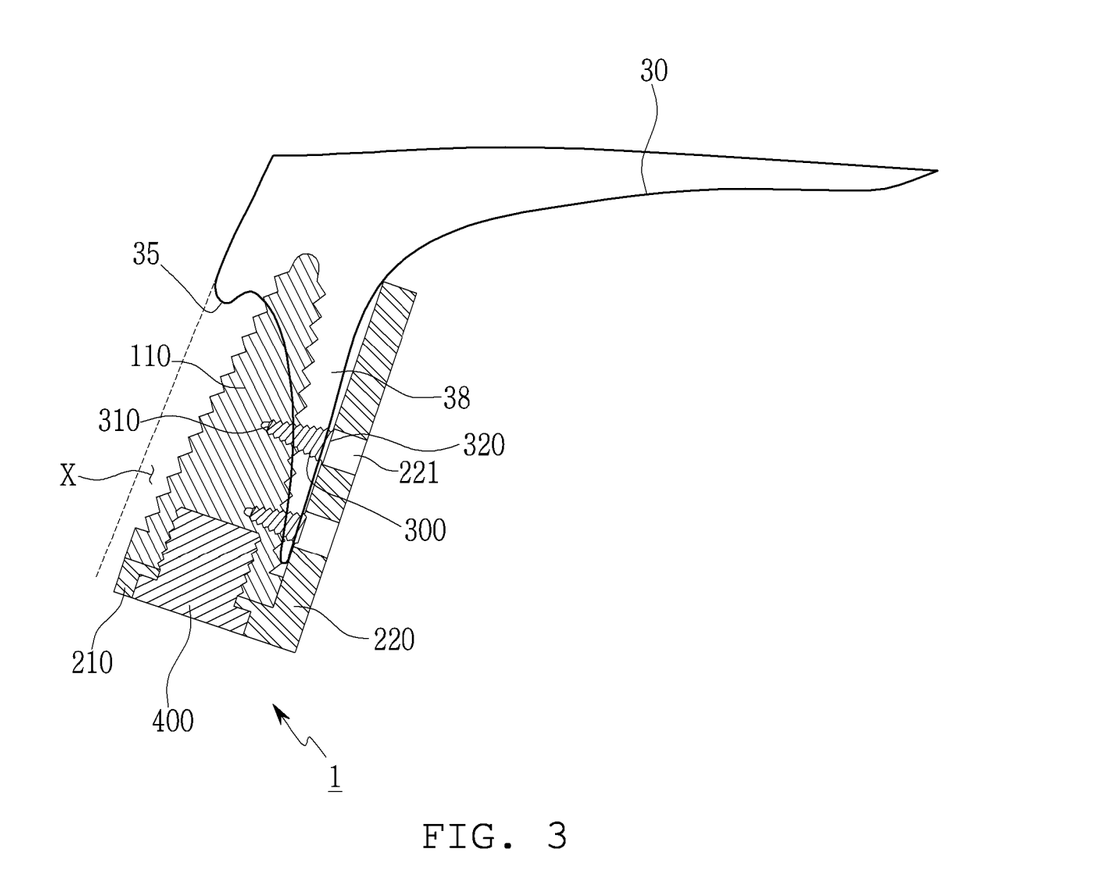
FIG. 3 is an exemplary view showing the lateral wall support implant system according to the present invention in an implanted state.
Figure 4:
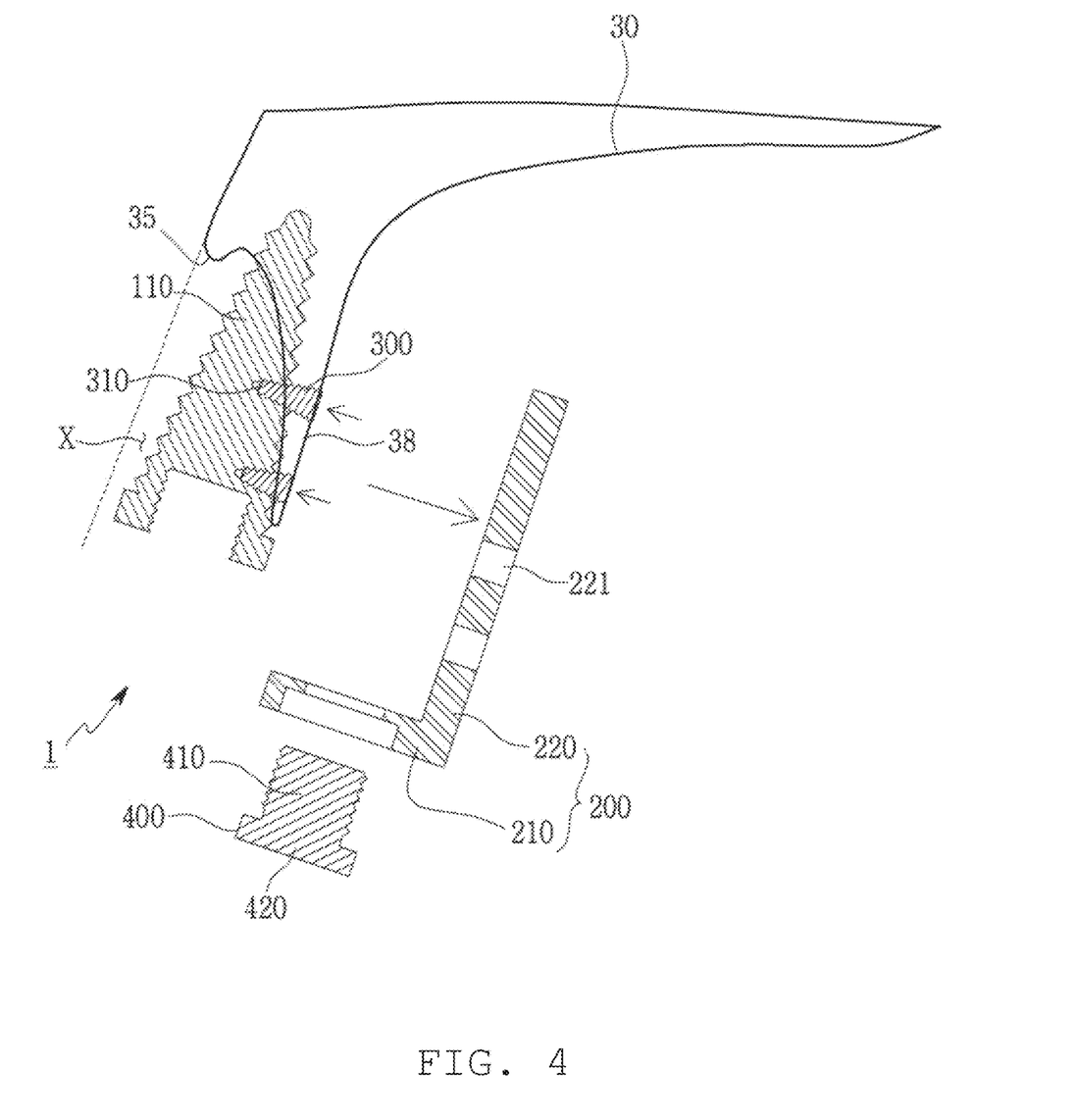
FIG. 4 is an exemplary view showing the procedure where the fixing member and the guide are separated from the base screw.
Figure 5:
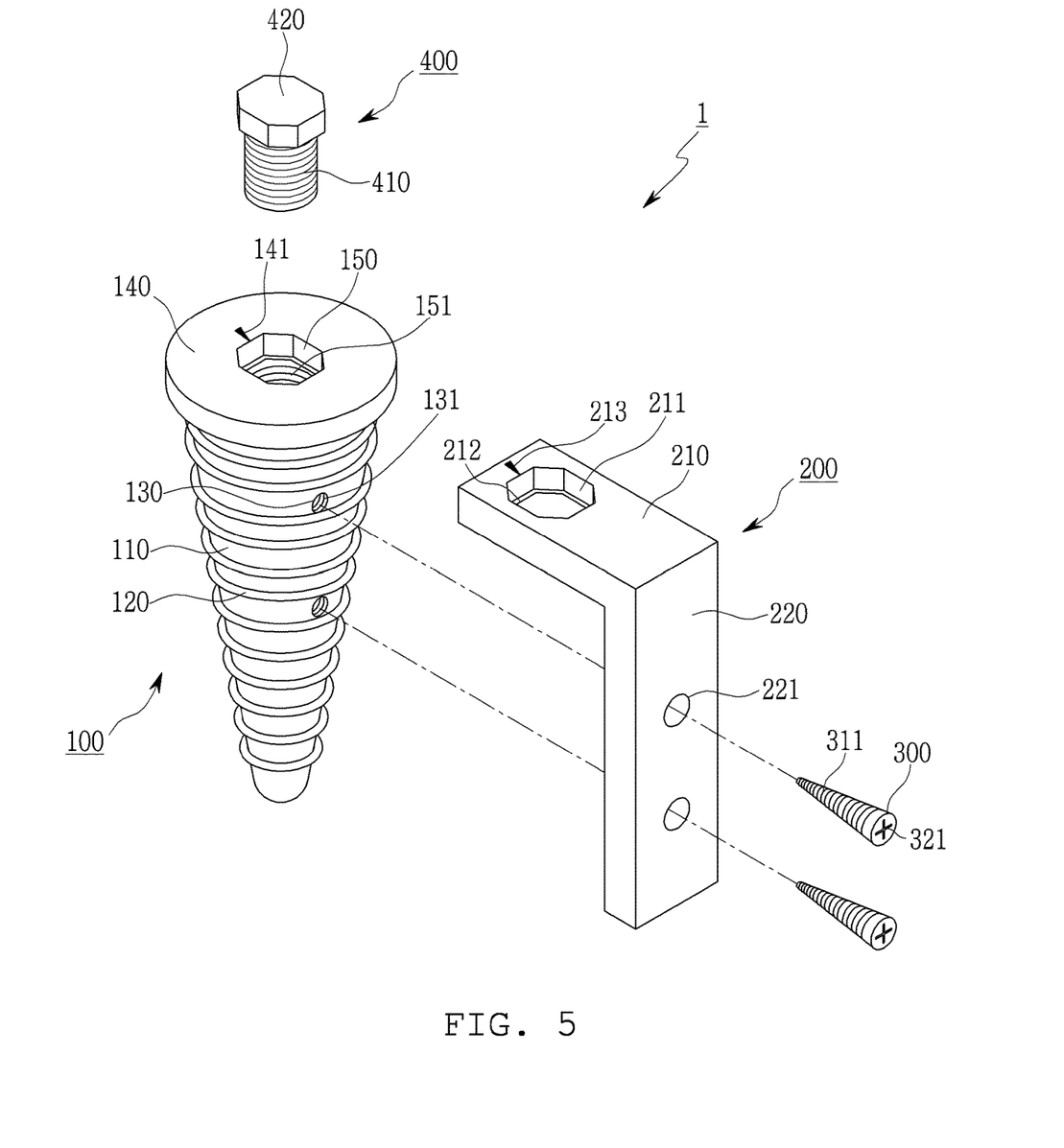
FIG. 5 is an exploded perspective view showing the lateral wall supported implant system according to the present invention.

FIG. 2 is an exemplary view showing a state where a lateral wall supported implant system according to the present invention is placed in a patient's face, FIGS. 3 and 4 are exemplary views showing the dental surgery of the lateral wall supported implant system according to the present invention, and FIG. 5 is an exploded perspective view showing the lateral wall supported implant system according to the present invention.

As shown, a lateral wall supported implant system 1 according to the present invention includes a primary screw 100 inserted into the alveolar bone, a surgical guide 200 disposed on a lateral wall 38 of the alveolar bone where the primary screw 100 is inserted, supporting screws 300 passing through the lateral wall 38 via the surgical guide 200 and then inserted into the primary screw 100 to provide a supporting force for the primary screw 100 so that the primary stability of the primary screw 100 is obtained, and a fixing member 400 for fixing the surgical guide 200 to the primary screw 100.

As shown in FIG. 2, the lateral wall supported implant system 1 according to the present invention is configured to allow the primary screw 100 corresponding to the fixture 11 in the conventional practice to be placed in the alveolar bone and the lateral wall 38 of the maxilla or mandible of a patient's face, while being supported against the lateral wall 38, so that the primary stability of the primary screw 100 can be ensured. In FIG. 2, the uvula 32, the lips 36, and the tongue 37 are also shown.

As shown in FIG. 3, if there is a bone tissue defect region X on the alveolar bone where the primary screw 100 is placed to carry out implant surgery, the lateral wall supported implant system 1 according to the present invention is configured to allow the primary screw 100 to be directly placed in the bone tissue defect region X, without having any separate bone graft, and to be then supported against the supporting screws 300, so that the primary stability of the primary screw 100 can be ensured. Further, the lateral wall supported implant system 1 according to the present invention may be applied even in the case where bone quantity and quantity are poor to thus fail to ensure the primary stability of the primary screw 100 after the primary screw 100 has been placed through the application of osteotomy, thereby ensuring the primary stability of the primary screw 100.

In the case of the application of the lateral wall supported implant system 1 according to the present invention, there are no processes (for about six months) of a bone graft for bone preservation and soft and hard tissue treatments so as to ensure the primary stability of the primary screw 100 and no additional treatment process of three to six months for the osseointegration of the primary screw 100, unlike the conventional implant surgery using the delayed implant placement, so that the lateral wall supported implant system 1 according to the present invention advantageously reduces the total time required for the implant surgery.

As shown in FIG. 2, the facial skeleton includes the palatine bone 30 surrounding top of the mouth M, the alveolar ridge 34 disposed on the front end of the palatine bone 30, and the anterior nasal spine 35 disposed on the front end of the alveolar ridge 34. The lateral wall supported implant system 1 according to the present invention is configured to allow the primary screw 100 corresponding to the fixture 11 to be coupled to the lateral wall 38 of the maxilla or mandible to thus achieve the primary stability.

The lateral wall 38 may be the palatal wall or lingual wall of the alveolar ridge 34.

The primary screw 100, which corresponds to the fixture 11 of the implant 10 in the conventional practice, is inserted into the alveolar bone. After the primary screw 100 has been placed in the alveolar bone, it ensures the primary stability by means of the supporting screws 300 and is osseointegrated with the alveolar bone. Next, the primary screw 100 is coupled to the abutment 13 and the crown 15.

The primary screw 100 is desirably used by machining the existing fixture 11 so as to have the compatibility with the existing abutment 13 and crown 15, but in some cases, the primary screw 100 may be customizedly or separately made.

As shown in FIG. 5, the primary screw 100 includes a primary screw body 110 having the shape of a cone whose diameter (R1 in FIG. 6) becomes small toward the base thereof, a primary screw thread 120 spirally formed on the outer peripheral surface of the primary screw body 110, supporting screw coupling holes 130 formed on the side peripheral surface of the primary screw body 110, a coupling flange 140 disposed on top of the primary screw body 110 and coupled to the abutment 13, and an abutment coupling hole 150 concavely formed on the central region of the coupling flange 140 and coupled to the abutment 13.

The primary screw body 110 is placed in the alveolar bone by means of the primary screw thread 120 formed on the outer peripheral surface thereof. The primary screw 100 is made of any one selected from titanium, cobalt-chrome, cobalt-chrome-molybdenum, cobalt-chrome-nickel, cobalt-nickel-chrome-molybdenum-titanium, a calcium orthophosphate derivative-coated metal, zirconia, a zirconium-coated metal, a titanium-coated metal, and other biocompatible metals.

The supporting screw coupling holes 130 are concavely formed horizontally inwardly from the side peripheral surface of the primary screw body 110 and thus coupled to the supporting screws 300. Each supporting screw coupling hole 130 has a first screw thread 131 formed on the inner peripheral surface thereof and coupled to a second screw thread 311 of the corresponding supporting screw 300.

One or more supporting screw coupling holes 130 may be formed according to the position of the alveolar bone and the position and thickness of the lateral wall 38 to which the surgical guide 200 is coupled.

To insert the supporting screws 300 into the primary screw 100, as shown in FIG. 3, the surgical guide 200 and the fixing member 400 are coupled to the primary screw 100, and after the insertion of the supporting screws 300, as shown in FIG. 4, the fixing member 400 and the surgical guide 200 are separated from the primary screw 100.

In the process, the fixing member 400 is coupled to the coupling flange 140 to fix the surgical guide 200 thereto, and if the primary stability of the primary screw 100 is ensured after the surgical guide 200 and the fixing member 400 have been separated from the primary screw 100, the abutment 13 (See FIGS. 1A to 1C) is coupled to the coupling flange 140.

The abutment coupling hole 150 is concavely formed on the central region of the coupling flange 140 to couple the fixing member 400 or the abutment 13 thereto, and further, the abutment coupling hole 150 has an abutment coupling screw thread 151 formed on the inner peripheral surface thereof.

In this case, the primary screw 100 is subjected to surface modification through which surface roughness becomes high to achieve fast osseointegration. In specific, the surface of the primary screw 100 is roughly machined to increase an active surface area on the boundary surface with the alveolar bone, so that the fast osseointegration with the alveolar bone can be obtained. The surface modification of the primary screw 100 may be carried out through any one selected from sandblasting after acid etching, the application of phosphate enriched titanium oxide, the application of resorbable blast media, laser peening, vacuum titanium plasma spraying, titanium oxide-sprayed grits, fine hydroxyapatite powder, and the like, which are well known in the art.

Figure 6:
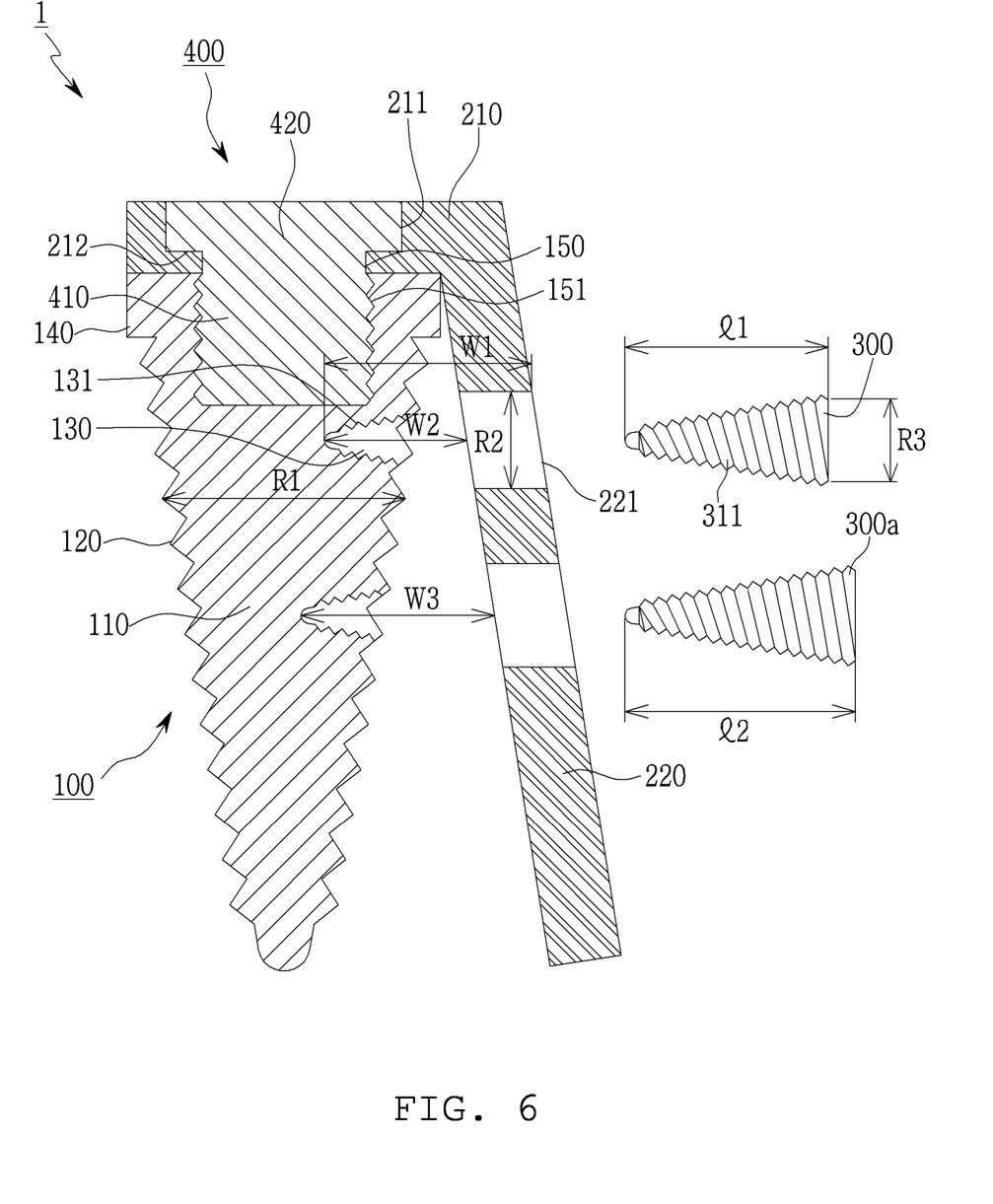
FIG. 6 is a side sectional view showing the lateral wall supported implant system according to the present invention.

The surgical guide 200 serves to guide the supporting screws 300 so that the supporting screws 300 can be accurately inserted into the supporting screw coupling holes 130 formed on the side peripheral surface of the primary screw 100. FIG. 6 is a side sectional view showing a process where the supporting screws 300 are inserted into the surgical guide 200 of the lateral wall supported implant system 1 according to the present invention.

As shown in FIGS. 5 and 6, the surgical guide 200 includes a seated plate 210 formed horizontally to be thus seated horizontally onto the coupling flange 140 of the primary screw 100 and a guide plate 220 bent from the end of the seated plate 210 to come into close contact with the lateral wall 38.

The seated plate 210 is seated onto the coupling flange 140, and next, the surgical guide 200 is fixed to the primary screw 100 by means of the fixing member 400. The surgical guide 200 serves to guide the supporting screws 300 to allow the supporting screws 300 to pass through the lateral wall 38 and to be thus coupled accurately to the supporting screw coupling holes 130 of the primary screw 100, and to do this, the seated plate 210 is fixed to top of the primary screw 100 to allow the surgical guide 200 to be located at an accurate position.

As shown in FIG. 6, the seated plate 210, which has a given length capable of covering the coupling flange 140, includes a head accommodation hole 211 pierced into the surface thereof to accommodate a head 420 of the fixing member 400. Further, the seated plate 210 has a head seating stepped protrusion 212 protruding from the head accommodation hole 211 to allow the head 420 to be accommodated in the head accommodation hole 211, without any downward movement.

As shown in FIG. 3, the guide plate 220 is bent from the end of the seated plate 210 and thus comes into close contact with the lateral wall 38. Further, the guide plate 220 has supporting screw guide holes 221 pierced into the surface thereof and corresponding to the supporting screw coupling holes 130.

The supporting screw guide holes 221 are aligned coaxially with the supporting screw coupling holes 130 when the surgical guide 200 is fixed to top of the primary screw 100 and the lateral wall 38 by means of the fixing member 400.

Before the lateral wall supported implant system 1 according to the present invention is placed, cone beam computed tomography (CBCT or C-arm CBCT) of the facial skeleton (the maxilla or mandible) of the patient is performed by a surgeon. Through the imaged data, the shapes, thicknesses, bone qualities, and contours of the alveolar bone and the adjacent lateral wall thereto where the implant system 1 will be placed can be acquired.

Figure 7A:
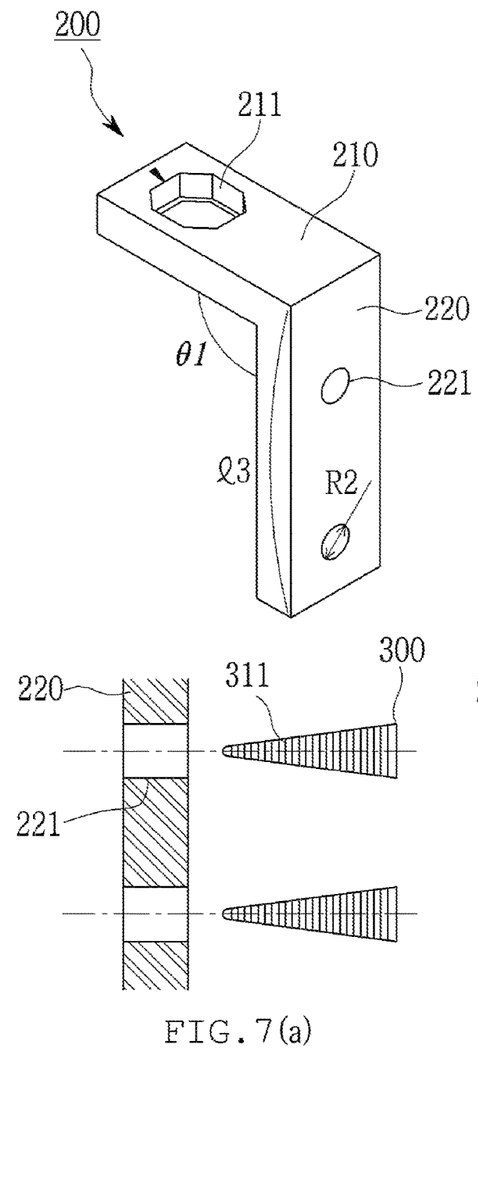
FIG. 7A is an exemplary view showing an example of the guide of the lateral wall support implant system according to the present invention.
Figure 7B:
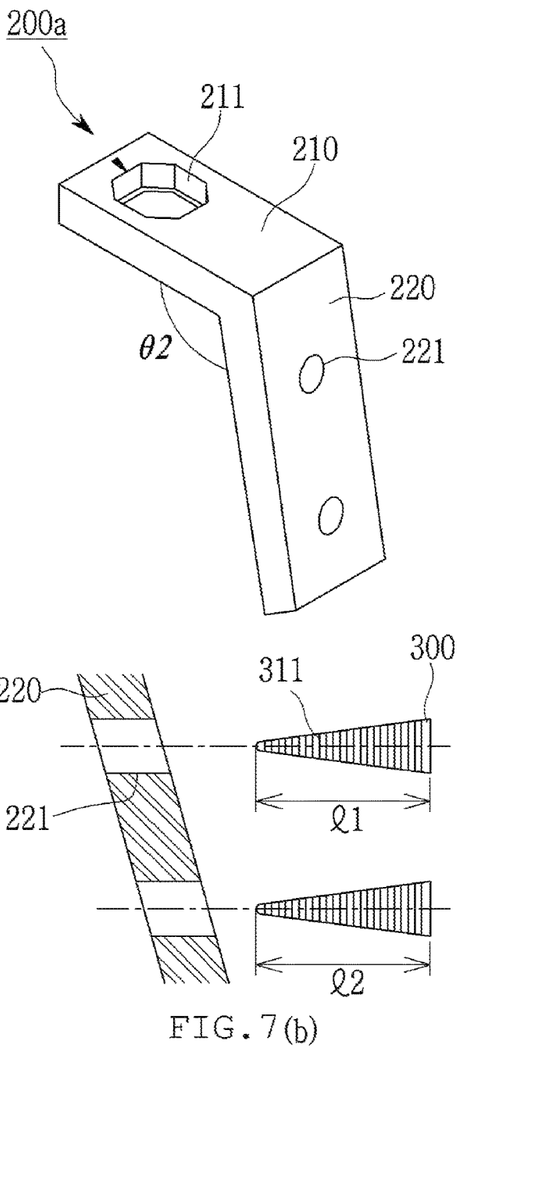
FIG. 7B is another exemplary view showing another example of the guide.
Figure 8:
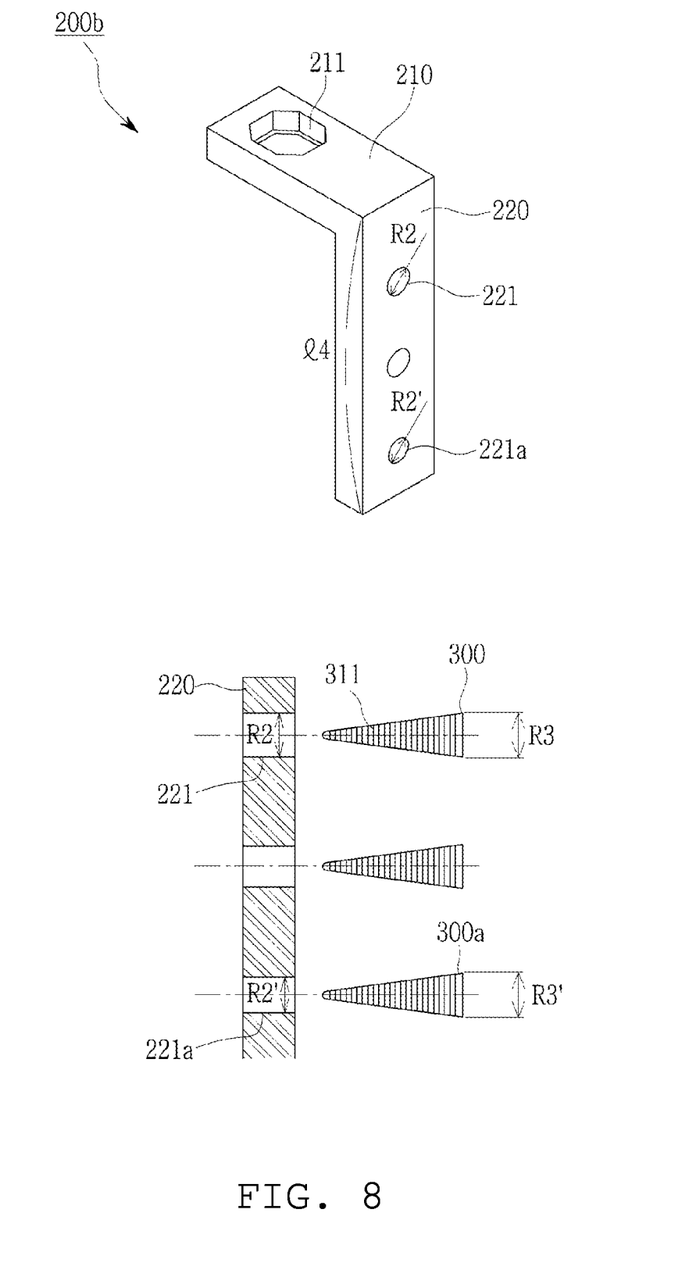
FIG. 8 is an exemplary view showing the guide of the lateral wall support implant system according to the present invention with a modified length, and an example showing the number and diameter of the support screw guide holes of the guide plate.

The guide plate 220 is designed on the basis of the acquired data so that it can come into close contact with the lateral wall 38 corresponding to the alveolar bone in which the primary screw 100 is placed. FIGS. 7A to 8 are exemplary views showing various examples of the guide plate 220.

According to the shape of the lateral wall 38, the guide plate 220 is vertical with respect to the seated plate 210 ($\theta 1=90°$), as shown in FIG. 7A, and otherwise, the guide plate 220 is slant with respect to the seated plate 210 ($\theta 2>90°$), as shown in FIG. 7B. Even though not shown, further, the guide plate 220 may have a three-dimensional curved shape corresponding to the shape of the lateral wall 38.

According to the shape of the lateral wall 38, further, the guide plate 220 is short in length, as shown in FIG. 7A, and otherwise, the guide plate 220 is long in length, as shown in FIG. 8 ($l3<l4$).

Even if the guide plate 220 has various angles with respect to the seated plate 210, the supporting screw coupling holes 221 are located coaxially with the supporting screw coupling holes 130, as shown in FIGS. 7A, 7B, and 8.

The supporting screws 300 pass through the lateral wall 38 via the supporting screw guide holes 221 of the guide plate 220 and are then inserted into the supporting screw coupling holes 130 of the primary screw 100. As a result, the supporting screws 300 serve to fix the primary screw 100 to the lateral wall 38, and even though there is a bone tissue defect, accordingly, the primary stability of the primary screw 100 can be ensured through the support force of the lateral wall 38.

Figure 9A:
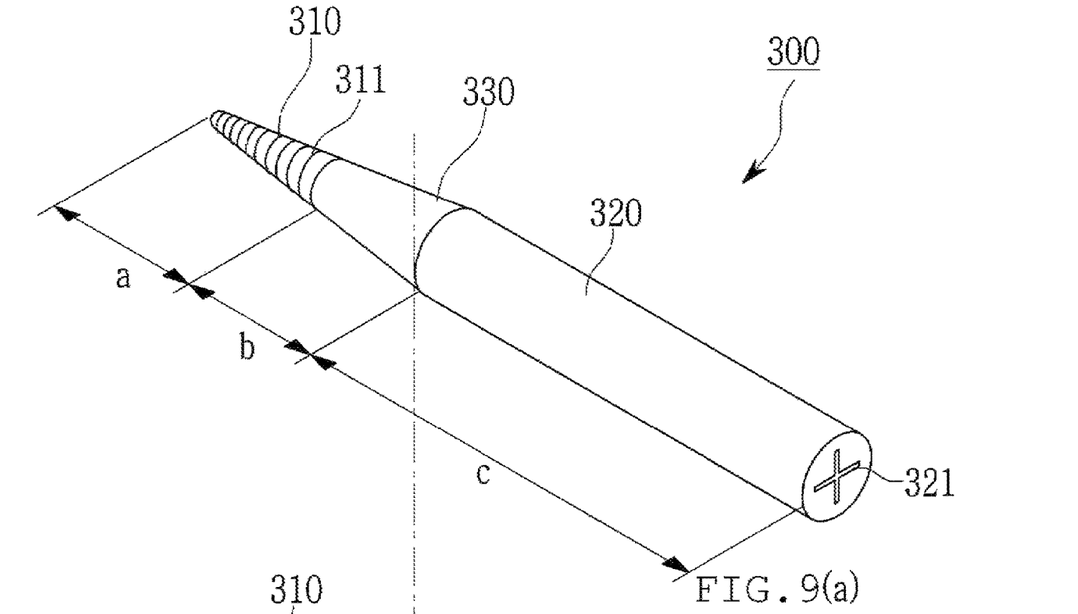
FIG. 9A is an exemplary view showing an example of the support screw of the lateral wall support implant system according to the present invention.
Figure 9B:
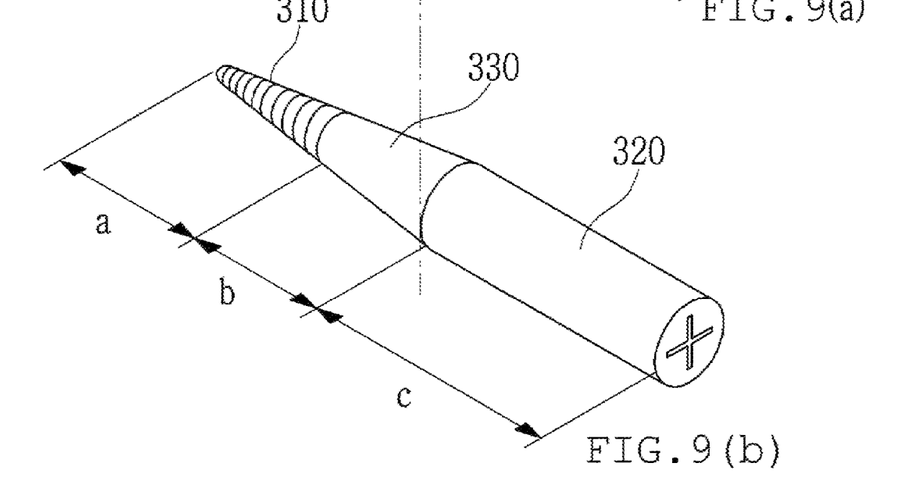
FIG. 9B is another exemplary view showing another example of the support screw.

FIGS. 9A and 9B are perspective views showing each supporting screw 300. Each supporting screw 300 includes a primary screw insertion 310 stage inserted into the corresponding supporting screw coupling hole 130 of the primary screw 100, a surgical guide insertion stage 320 inserted into the corresponding supporting screw guide hole 221 of the surgical guide 200, and a connection stage 330 disposed between the primary screw insertion stage 310 and the surgical guide insertion stage 320 to be inserted into the lateral wall 38.

In this case, a length a of the primary screw insertion stage 310, a length b of the connection stage 330, and a length c of the surgical guide insertion stage 320 may be different from one another according to the shape of the lateral wall 38. Further, as shown in FIG. 10A, the supporting screw 300 may become gradually large in outer diameter as it goes from the front end periphery thereof to the rear end periphery thereof, and otherwise, as shown in FIG. 10B, only the primary screw insertion stage 310 of the supporting screw 300 may become gradually large in outer diameter and the surgical guide insertion stage 320 and the connection stage 330 may have the same diameter as each other.

Figure 10A:
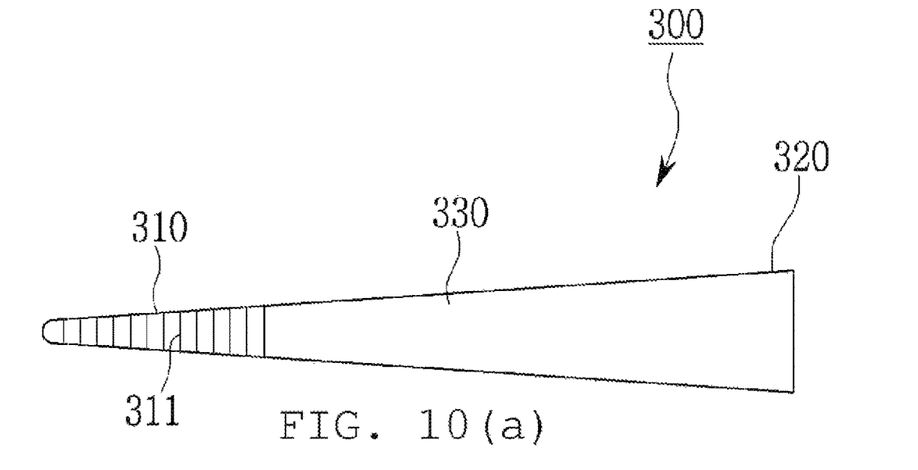
FIG. 10A is an exemplary view showing an example of the shape and thread formation range of the support screw of the lateral wall support implant system according to the present invention.
Figure 10B:
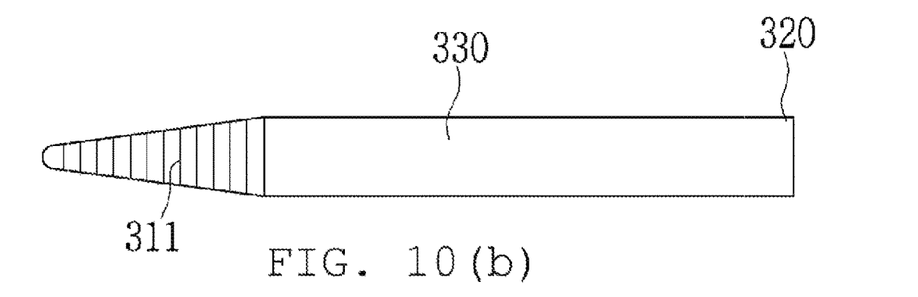
FIG. 10B is another exemplary view showing another example of the shape and thread formation range of the support screw.
Figure 10C:
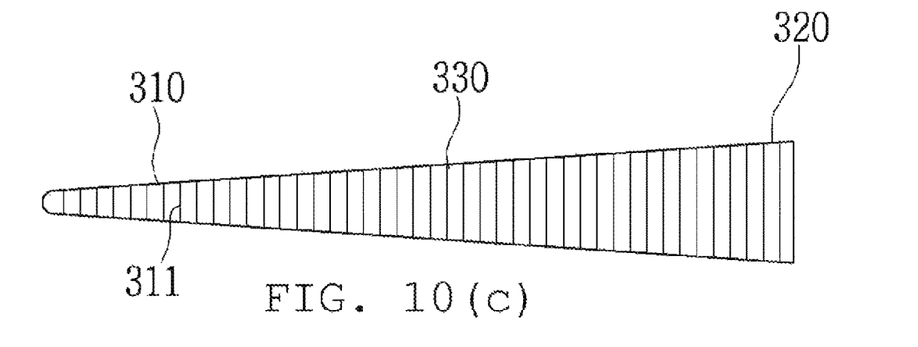
FIG. 10C is yet another exemplary view showing another example of the shape and thread formation range of the support screw.
Figure 10D:
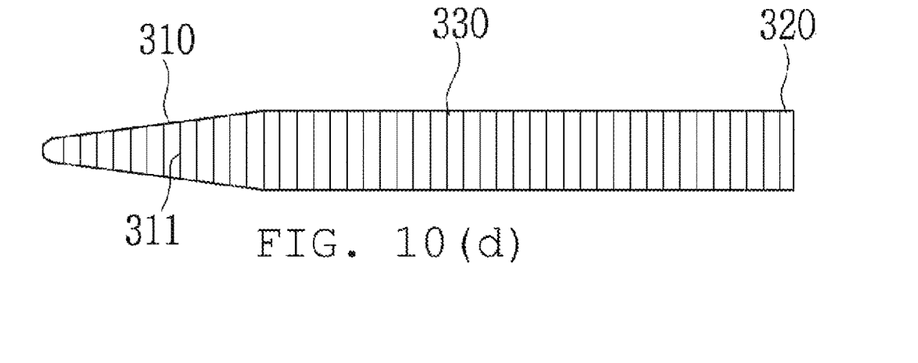
FIG. 10D is still another exemplary view showing another example of the shape and thread formation range of the support screw.

Further, as shown in FIGS. 10A and 10B, the second screw thread 311 is formed only on the outer peripheral surface of the primary screw insertion stage 310, and otherwise, as shown in FIGS. 10C and 10D, the second screw thread 311 is formed over the entire stage of the supporting screw 300.

Further, the surgical guide insertion stage 320 has an operating member fastening hole 321 formed on the rear end thereof to insert an operating member (not shown), such as a drill for rotating the supporting screw 300.

As shown in FIG. 6, if the seated plate 210 of the surgical guide 200 is fixed to top of the primary screw 100 by means of the fixing member 400, the supporting screw guide holes 221 are located coaxially with the supporting screw coupling holes 130.

After the supporting screws 300 are inserted into the supporting screw guide holes 221, they pass through the lateral wall 38 and are then screw-coupled to the supporting screw coupling holes 130. The second screw threads 311 formed on the outer peripheral surfaces of the supporting screws 300 pass through the lateral wall 38 by means of osteotomy and are then inserted into the supporting screw coupling holes 130, but of course, the supporting screws 300 pass through the lateral wall 38 via the insertion holes formed in advance by a drill according to the thickness and density of the lateral wall 38 and are then inserted into the supporting screw coupling holes 130. In this case, the insertion holes formed by the drill are desirably smaller than the outer diameters of the supporting screws 300.

Further, the inner diameters R2 of the supporting screw guide holes 221 are desirably larger than the maximum outer diameters R3 of the supporting screws 300. As shown in FIG. 4, in this case, if it is desired to separate the surgical guide 200 from the primary screw 100 after the supporting screws 300 have been fastened to the primary screw 100, it can be easily separated from the primary screw 100, without any interference between the supporting screws 300 and the supporting screw guide holes 221.

In this case, as shown in FIG. 10A, if the supporting screws 300 become gradually large in outer diameter, the alveolar bone is compressedly pushed outwardly when the supporting screws 300 are rotatably inserted into the lateral wall 38, so that osseodensification may occur or bone dust may be produced. Accordingly, as shown in FIG. 9A, it is desirable that each supporting screw 300 has the region c where the outer diameter thereof is constantly maintained, and further, it is desirable that the region b where the outer diameter thereof becomes gradually increased from the primary screw insertion stage 310 is designed to have a minimized length.

As shown in FIG. 6, desirably, the length of each supporting screw 300 is shorter than a length W1 from the front end of the corresponding supporting screw coupling hole 130 to the outlet of the corresponding supporting screw guide hole 221 of the surgical guide 200 in a state where the surgical guide 200 is fixed to the primary screw 100 and longer than a length W2 from the front end of the corresponding supporting screw coupling hole 130 to the inlet of the corresponding supporting screw guide hole 221 of the surgical guide 200. Moreover, the same principle applies to the length W3 as shown in FIG. 6.

If the length of the supporting screw 300 is within the above-mentioned range, as shown in FIG. 3, the rear end of the supporting screw 300 is accommodated in the corresponding supporting screw guide hole 221 t be not exposed to the outside when the supporting screw 300 is fastened to the primary screw 100 through the lateral wall 38, and if the surgical guide 200 is separated from the lateral wall 38, as shown in FIG. 4, the supporting screw 300 is pressurized into the lateral wall 38 to be prevented from protruding outwardly from the lateral wall 38.

Further, as shown in FIG. 6, if the guide plate 220 is slant with respect to the seated plate 210, distances between the upper and lower supporting screw guide holes 221 and the upper and lower supporting screw coupling holes 130 may be different from each other.

If the guide plate 220 is slantly formed, accordingly, the upper and lower supporting screws 300 and 300a desirably have different lengths from each other (l1<l2).

Further, as shown in FIG. 8, the guide plate 220 becomes long in length, and if the upper and lower supporting screws 300 and 300a are inserted into the supporting screw guide holes 221, they may have different outer diameters from each other (R3>R3').

As the primary screw 100 becomes gradually small in outer diameter toward the lower portion thereof from the upper portion thereof, the supporting screws 300, which are fastened to the primary screw 100, become gradually small in outer diameter at the same rate as the primary screw 100 so as to provide coupling stability with the primary screw 100.

Moreover, as shown in FIG. 4, the supporting screws 300 are kept in the inserted state into the lateral wall 38 until the primary stability of the primary screw 100 is ensured in the state where the surgical guide 200 is separated from the primary screw 100. After that, if the primary stability of the primary screw 100 is ensured, the supporting screws 300 can be separated from the lateral wall 38.

If it is desired to separate the supporting screws 300 from the lateral wall 38, desirably, the surfaces of the supporting screws are 300 polished smoothly to be not osseointegrated with the lateral wall 38. In specific, the surfaces of the supporting screws 300 are polished to a low surface roughness. Of course, such polishing is applied to the second screw threads 311, so that the osseointegration of the second screw threads 311 with the lateral wall 38 can be prevented or delayed.

Like this, if the outer peripheral surfaces of the supporting screws 300 are machined smoothly, the supporting screws 300 can be easily separated from the lateral wall 38 after the primary stability of the primary screw 100 has been ensured.

In the state where the primary screw 100 and the surgical guide 200 are blocked from each other by means of the lateral wall 38, the supporting screws 300 can be accurately inserted into the supporting screw coupling holes 130 when the supporting screw coupling holes 130 should be aligned coaxially with the supporting screw guide holes 221.

To do this, markers 141 and 213 are disposed on top of the primary screw 100 and the surface of the seated plate 210 of the surgical guide 200 to align the primary screw 100 and the surgical guide 200 with each other, so that upon the surgery, the primary screw 100 and the surgical guide 200 can be easily aligned with each other.

As shown, the markers 141 and 213 have the shapes of given images or marks, and otherwise, they may have physical structures lockedly coupled to each other.

The fixing member 400 serves to fix the surgical guide 200 to the primary screw 100 and the lateral wall 38. The fixing member 400 includes a screw insertion stage 410 inserted into the abutment coupling hole 150 of the primary screw 100 and the head 420 disposed on top of the screw insertion stage 410.

The screw insertion stage 410 of the fixing member 400 has the same configuration as the abutment 13. If the surgical guide 200 and the fixing member 400 are separated from the primary screw 100, accordingly, the abutment 13 can be coupled to the primary screw 100.

In this case, the lateral wall supported implant system 1 according to the present invention has the surgical guide 200 and the fixing member 400 provided independently of each other, but in some cases, it may have the surgical guide 200 and the fixing member 400 coupled unitarily to each other.

If the surgical guide 200 and the fixing member 400 are provided independently of each other, high versatility may be ensured, and if the surgical guide 200 and the fixing member 400 are coupled unitarily to each other, only a unitary guide, which is made to conform to the primary screw 100, may be limitedly used.

Now, a surgical procedure using the lateral wall supported implant system 1 having the above-mentioned configuration according to the present invention will be explained with reference to FIGS. 2 to 10D.

The cone beam computed tomography (CBCT or C-arm CBCT) of the facial skeleton (the maxilla or mandible) of the patient is performed by the surgeon. Through the imaged data, the shapes, thicknesses, bone qualities, and contours of the alveolar bone and the adjacent lateral wall thereto where the implant system 1 will be placed can be acquired.

If the three-dimensional shape data of the lateral wall 38 is obtained, the surgical guide 200 corresponding to the obtained three-dimensional shape data of the lateral wall 38 is selected by the surgeon. The surgical guide 200 proper for the patient is selected from the surgical guides 200 having various angles, and otherwise, the surgical guide 200 conforming to the patient may be made.

Virtual simulation for the coupled states of the primary screw 100 and the selected surgical guide 200 to the acquired three-dimensional facial skeleton of the patient is performed by the surgeon, and next, the supporting screw guide holes 221 are pierced into the surgical guide 200 to be aligned coaxially with the supporting screw coupling holes 130.

Next, the supporting screws 300, which have appropriate lengths and outer diameters, can be selected or made in consideration of the shape of the surgical guide 200 and the distance between the surgical guide 200 and the primary screw 100.

If the primary screw 100, the surgical guide 200, and the supporting screws 300 are prepared, the patient's tooth is extracted by the surgeon, and next, after the gum B of the extracted region is incised, the alveolar bone is drilled.

The primary screw 100 is placed in the drilled insertion hole of the alveolar bone. In this case, as shown in FIG. 3, if there is the region X where the facial bone is lost, the primary screw 100 does not ensure a sufficient supporting force.

If the placement of the primary screw 100 is finished, the surgical guide 200 is located by the surgeon. In specific, the seated plate 210 is located horizontally with respect to the coupling flange 140 of the primary screw 100, and the guide plate 220 is located on the lateral wall 38. In this case, the primary screw 100 and the surgical guide 200 are accurately aligned with each other by means of the markers 141 and 213. Further, the fixing member 400 is coupled to the abutment coupling hole 150 to allow the surgical guide 200 to be fixed to the primary screw 100 and the lateral wall 38.

After the surgical guide 200 has been fixed to the primary screw 100 and the lateral wall 38, the supporting screws 300 are inserted into the supporting screw guide holes 221 by the surgeon. In consideration of the thickness and bone density of the lateral wall 38, in this case, the supporting screws 300 are directly inserted into the lateral wall 38 by means of osteotomy, and otherwise, after insertion holes are formed on the lateral wall 38 by means of a drill, the supporting screws 300 are inserted into the insertion holes.

After that, the supporting screws 300 are completely inserted into the supporting screw coupling holes 130. If the supporting screws 300 are completely inserted into the supporting screw coupling holes 130, as shown in FIG. 3, the fixing member 400 is separated from the primary screw 100 to allow the surgical guide 200 to be removed from the lateral wall 38, as shown in FIG. 4.

As a result, the supporting screws 300 serve to fix the lateral wall 38 and the primary screw 100 to each other, thereby ensuring the primary stability of the primary screw 100. In this case, the osseointegration occurs on the primary screw 100 so that the primary stability of the primary screw 100 can be obtained. If the primary stability of the primary screw 100 is obtained through the osseointegration as time passes, the supporting screws 300 are separated from the lateral wall 38 and the primary screw 100 by the surgeon. In some cases, they may be kept at the coupled state thereto, without any separation.

After the supporting screws 300 have been separated from the lateral wall 38 and the primary screw 100, the abutment 13 is coupled to the top of the primary screw 100, and next, the crown 15 is coupled to the abutment 13, thereby completing the surgery of the implant system 1.

As described above, the lateral wall supported implant system according to the present invention is configured to allow the supporting screws to be coupled to the primary screw through the lateral wall in the case where it is hard to ensure the primary stability of the primary screw when there is a big bone tissue defect or poor bone quantity and quality after the tooth has been extracted.

As a result, the primary stability of the primary screw can be ensured through the supporting force of the lateral wall so that the time for the bone graft in the conventional practice will be not needed anymore, thereby remarkably reducing the period of time for the implant surgery.

In addition, the lateral wall supported implant system according to the present invention is configured to allow only the supporting screw coupling holes to be formed on the side peripheral surface of the fixture used in the conventional practice, thereby being advantageously compatible with the existing implant products.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A lateral wall supported implant system comprising:
a primary screw (100) configured to be placed on a alveolar bone;
an abutment configured to be received by the primary screw (100);
a surgical guide (200) configured to be disposed on a lateral wall (38) of the alveolar bone with the primary screw (100) placed therein; and
supporting screws (300) configured to pass through the surgical guide (200) and the lateral wall (38), and configured to be coupled to the primary screw (100) to provide supporting forces for the primary screw (100) so that the primary screw (100) is supported against the lateral wall (38) to have primary stability thereof, wherein each of the primary screw (100), the surgical guide (200), and the supporting screws (300) are manufactured based on data obtained from tomographic images of a patient, wherein the primary screw (100) includes an abutment coupling hole (150) and support screw coupling holes (130) extending through the primary screw (100), each of the support screw coupling holes (130) comprising an entry point and an exit point, wherein the entry point faces the surgical guide (200) and the exit point faces away from the surgical guide (200), and the support screw coupling holes (130) are formed on a side of the primary screw (100) facing the surgical guide (200) to correspond to the supporting screws (300), wherein the surgical guide (200) comprises:
a seated plate (210) configured to be horizontally seated on an upper surface of the primary screw (100), and
a guide plate (220) comprises a first side and a second side, the first side faces the support screw coupling holes (130) and the second side facing away from the support screw coupling holes (130), and the guide plate (220) is bent to correspond to a shape of the lateral wall (38) and extending to contact the lateral wall (38) with respect to the seated plate (210), wherein:
the guide plate (220) is formed with a plurality of supporting screw guide holes (221) penetrating coaxially with the support screw coupling holes (130) according to an alignment of the primary screw (100) and the surgical guide (200) to guide the supporting screws (300) into the support screw coupling holes (130), wherein the supporting screw guide holes (221) comprise an inlet and an outlet, the inlet being disposed on the second side of the guide plate (220) and the outlet being disposed on the first side of the guide plate (220), and a length of each of the supporting screws (300) is manufactured such that, in a state when the supporting screws (300) are inserted into the support screw coupling holes (130) of the primary screw (100) through the plurality of supporting screw guide holes (221) of the surgical guide (200), the length is shorter than a first length (W1), wherein the first length (W1) is defined from the exit point of the support screw coupling holes (130) to the inlet of the supporting screw guide holes (221) of the surgical guide (200), and the length of the each of the supporting screws (300) is longer than a second length (W2), the second length (W2) defined from the exit point of the support screw coupling holes (130) to the outlet of the support screw guide holes (221) of the surgical guide (200).

2. The lateral wall supported implant system according to claim 1, wherein the abutment coupling hole (150) is concavely formed on top of the primary screw (100) to insert the abutment into the abutment coupling hole (150).

3. The lateral wall supported implant system according to claim 2, wherein the seated plate (210) is seated horizontally onto top of the primary screw (100), and the surgical guide (200) is fixed to the primary screw (100) by means of a fixing member (400) passing through the seated plate (210) and then coupled to the abutment coupling hole (150).

4. The lateral wall supported implant system according to claim 1, wherein inner diameters R2 of the supporting screw guide holes (221) are larger than maximum outer diameters R3 of the supporting screws (300).

5. The lateral wall supported implant system according to claim 4, wherein the primary screw (100) and the seated plate (210) have markers (141 and 213) disposed on their respective tops thereof to indicate coupling positions of the primary screw (100) and the seated plate (210) respectively so that the supporting screw guide holes (221) are aligned coaxially with the support screw coupling holes (130).

6. The lateral wall supported implant system according to claim 5, wherein each of the supporting screws (300) comprises a first end, a second end and an outer diameter, wherein the outer diameter of each supporting screws (300) increases from the first end to the second end and the supporting screws (300) are inserted into the corresponding support screw coupling holes (130).

7. The lateral wall supported implant system according to claim 6, wherein each supporting screw (300) has an outer peripheral surface and a screw thread (311), the screw thread (311) being formed on the outer peripheral surface, and the screw thread (311) is coupled to the corresponding support screw coupling hole (130).

8. The lateral wall supported implant system according to claim 7, wherein the seated plate (210) has a head accommodation hole (211) thus located coaxially with the abutment coupling hole (150), wherein the fixing member (400) comprises:
a screw insertion stage (410) having a shape corresponding to a screw portion of the abutment coupling hole (150) and is screw-coupled to the abutment coupling hole (150) through the head accommodation hole (211); and
a head (420) disposed on top of the screw insertion stage (410) and accommodated in the head accommodation hole (211), while having a larger area than the screw insertion stage (410).

9. The lateral wall supported implant system according to claim 6, wherein each of the supporting screws (300) has a screw thread (311) formed on the outer peripheral surface over the entire region of the supporting screws (300).

10. The lateral wall supported implant system according to claim 5, wherein each of the supporting screws (300) comprises an outer diameter, a first end and a second end, wherein the outer diameter of each supporting screw (300) increases from the first end to the second end.

11. The lateral wall supported implant system according to claim 10, wherein each of the supporting screws (300) has an outer peripheral surface, each of the supporting screws (300) has a screw thread (311) formed on the outer peripheral surface, the screw thread (311) corresponds to a region coupled to one of the corresponding support screw coupling holes (130).

12. The lateral wall supported implant system according to claim 10, wherein each of the supporting screws (300) has a screw thread (311) and an outer peripheral surface, the screw thread (311) being formed on the outer peripheral surface over the entire region of each of the supporting screws (300).

* * * * *